United States Patent [19]
Ravas

[11] 3,715,649
[45] Feb. 6, 1973

[54] STAGGERED PHASE PULSE WIDTH MODULATED INVERTER APPARATUS

[75] Inventor: Richard J. Ravas, Monroeville, Pa.

[73] Assignee: Westinghouse Electric Corporation, Pittsburgh, Pa.

[22] Filed: Jan. 25, 1967

[21] Appl. No.: 611,697

[52] U.S. Cl. .................................................321/45 R
[51] Int. Cl. ..................................................H02m 7/52
[58] Field of Search .........321/16, 18, 43, 45, 44, SW

[56] References Cited

UNITED STATES PATENTS

| | | | |
|---|---|---|---|
| 3,378,751 | 4/1968 | Walker | 321/18 |
| 3,346,794 | 10/1967 | Stemmler | 321/9 A |
| 3,409,817 | 11/1968 | Gillett | 321/5 |
| 3,310,730 | 3/1967 | Ruch | 321/45 X |
| 3,319,147 | 5/1967 | Mapham | 321/45 X |
| 3,321,697 | 5/1967 | Etter | 321/45 |
| 3,324,376 | 6/1967 | Hunt | 321/8 X |
| 3,334,292 | 8/1967 | King et al. | 321/69 X |
| 3,376,490 | 4/1968 | Osugi | 321/5 |

OTHER PUBLICATIONS

Principles of Inverter Circuits, B. D. Bedford & R. G. Hoft, John Wiley & Sons, Inc., New York, Published Dec. 23, 1964, pp. 235–247 and 310–315.

Primary Examiner—William M. Shoop, Jr.
Attorney—F. H. Henson, C. F. Renz and A. S. Oddi

[57] ABSTRACT

This disclosure describes an inverter utilizing semiconductor switching devices, such as transistors or gate controlled switches, in the legs of the inverter. The legs are connected in a bridge circuit and to a source of direct current. A filter network is connected between the legs and a load across which the alternating output of the inverter is to be developed. The devices are gated on by the application of pulse width modulated signals having an actual carrier frequency to the control electrodes of the devices of the various legs of the inverter. The pulse width modulated signals are applied to the various legs in a predetermined staggered phase relationship so that the effective carrier frequency as seen by the filter network is a higher multiple of the actual carrier frequency. Thus, the filter network need only filter out the effective carrier frequency rather than the lower actual carrier frequency, while the switching devices are switched at the actual carrier frequency at high efficiency.

9 Claims, 7 Drawing Figures

STAGGERED PHASE PULSE WIDTH MODULATED INVERTER APPARATUS

The present invention relates to inverter apparatus and, more particularly, to inverter apparatus using pulse width modulation techniques.

A straight forward inverter technique commonly used to convert direct current into alternating current at a predetermined output frequency is to generate a square wave at the desired output frequency and then to filter out all harmonics of the fundamental leaving the fundamental as a substantially pure sinusoidal waveform at the desired output frequency. The principal disadvantage of inverter systems of this type is that the size and weight of the filter required to filter out the harmonics of the output frequency become quite large at normal output power frequencies of 50 to 400 Hz. In a typical embodiment of an inverter of the described type, the filter size may be on the order of ten times that of the output transformer rated to carry the output power of the inverter.

With the advent of semiconductor devices which are capable of switching power at much higher frequencies than normal power frequencies, advantage can be taken of high frequency synthesis techniques to reduce the size and weight of inverter apparatus. One of the high frequency synthesis techniques is pulse width modulation, wherein a waveform having a carrier frequency of at least 10 times that of the desired output frequency of the inverter is generated, and the rectangular pulses of the waveform are modulated according to width so that the resultant DC or average level of the pulse modulated waveform varies at the desired output frequency. The pulse width modulated waveform is then passed through a low pass filter which has a frequency cutoff slightly below that of the carrier frequency. The resultant output of the inverter is a sinusoidal waveform at the desired output frequency. The major advantage of such a system is that the filter need only reject the carrier frequency and its harmonics rather than the harmonics of the output frequency, which are, of course, at much lower frequency levels. Through such techniques it is possible to reduce greatly the physical size and weight of the filter required for use in the inverter. It moreover may be seen that additional advantages as to filter size and weight can be achieved if the carrier frequency is made as high as possible with respect to the desired output frequency of the inverter. Power losses in semiconductor switching devices occur mainly during switching and thus it is desirable to switch the devices at as low a frequency as possible to minimize losses. It therefore follows that it would be highly desirable for the inverter to operate with an effective carrier frequency higher than the actual switching frequency of the switching devices so that the devices operate efficiently while filter requirements are minimized.

It is therefore an object of the present invention to provide new and improved inverter apparatus using pulse width modulation techniques.

It is a further object to provide new and improved inverter apparatus using pulse width modulation techniques wherein the inverter apparatus is highly efficient and of minimum size and weight.

It is a still further object to provide new and improved inverter apparatus using pulse width modulation techniques wherein the effective carrier frequency of the pulse width modulated waveform is increased through the phase control of the switching devices of the inverter apparatus.

Broadly, the above-cited objects are accomplished by providing inverter apparatus in which a bridge circuit is utilized including a plurality of legs, each leg including a pair of switching devices. The switched state of the switching device is controlled by a pulse width modulated waveform having a predetermined carrier frequency and an average value which varies at the desired output frequency of the inverter. A filter is operative between the legs and a load, with the filter being selected to reject all frequencies above and including a given multiple of the predetermined carrier frequency of the pulse width modulated waveform. The pulse width modulated signals are applied to the switching devices of the respective legs of the bridge circuit in such a phase relationship that the effective carrier frequency appears to be the multiple of the predetermined carrier frequency that is produced by a single leg at the bridge.

These and other objects and advantages of the present invention will become more apparent when considered in view of the following specification and drawings in which.

Figure 1:
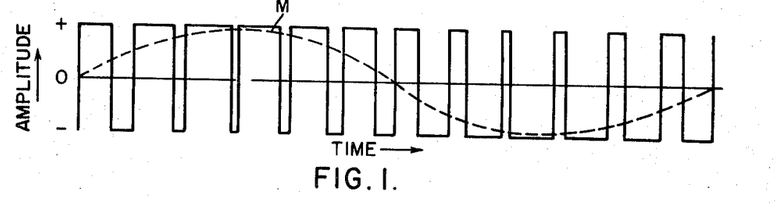
FIG. 1 is a waveform diagram of a pulse width modulated signal utilized to explain the operation of the present invention.

Referring now to FIG. 1, a pulse width modulated waveform is shown with amplitude plotted as a function of time. The pulse width modulated waveform has a carrier frequency $f_c$, which for example may be 10 kHz. The carrier frequency waveform is pulse width modulated so that the width of the pulses varies, as shown, so that the DC level of the composite waveform is substantially sinusoidal as illustrated by the waveform M which varies at a desired output frequency $f_o$, which may for example be 400 Hz. By passing the pulse width modulated waveform as shown in FIG. 1 through a filter which has a frequency cutoff just below the carrier frequency $f_c$, an output from the filter may be obtained which will be the waveform M and will be at the output frequency $f_o$. The filter will eliminate the fundamental of the carrier $f_c$ as well as the harmonics thereof. Thus, signals at the output frequency $f_o$ will be present to be applied to a load circuit.

Figure 2:
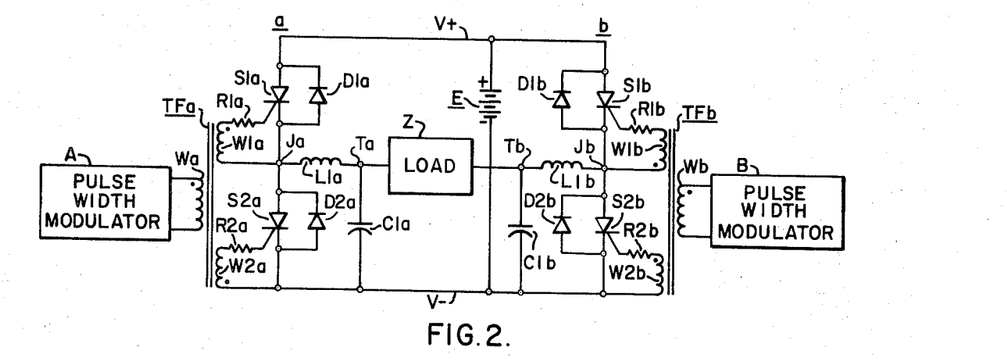
FIG. 2 is a schematic diagram of one embodiment of the inverter apparatus of the present invention.

FIG. 2 shows a schematic diagram of an inverter utilizing pulse width modulated signals as well as a staggered phase technique as will now be discussed. The inverter as shown in FIG. 2 includes a bridge circuit having two legs $a$ and $b$. The leg $a$ includes a pair of switching devices S1a and S2a and the leg b includes a pair of switching devices S1b and S2b. The switching devices S1a, S2a, S1b and S2b are illustrated to be gate controlled switches (GCSs). Such a device is placed in a closed circuit state between anode and cathode by the application of a positive polarity pulse to the gate electrode thereof (with respect to cathode) and is placed in an open circuit condition between anode and cathode by the application of a negative polarity pulse thereto (with respect to cathode). However, it should be understood that other semiconductor switching devices, such as transistors, can also be utilized. The legs a and b are connected across a source of direct current which is shown in FIG. 2 as a battery E with its positive electrode connection to a positive line V+ and its negative electrode connected to a negative line V−. The anode electrodes of the controlled switches S1a and S1b are connected to the positive line V+, while the cathode electrodes of the controlled switches S2a and S2b are connected to the negative line V−. The cathode and anode electrodes of the devices S1a and S2a, respectively, are connected at a junction Ja, and the cathode and anode electrodes, respectively, of the devices S1b and S2b are connected at a junction Jb.

A filter network including an inductor L1a and a capacitor C1a is provided, with one end of the inductor L1a connected to the junction point Ja and the capacitor C1a connected between the other end of the inductor L1a and the V-line. An output terminal Ta for the inverter is provided at the junction between the inductor L1a and the capacitor C1a. A filter network including an inductor L1b and capacitor C1b is provided, with one end of the inductor L1b connected to the junction point Jb, and the capacitor C1b connected between the other end of the inductor L1b and the V− line. An output terminal Tb provides the other output terminal for the inverter at the junction point between the inductor L1b and the capacitor C1b. A load circuit Z shown schematically by the block is connected between the output terminals Ta and Tb with alternating current of the desired output frequency $f_o$ applied thereto.

The conductive state of the gate controlled switches S1a, S2a, S1b and S2b is controlled by supplying a pulse width modulated signal to the gate electrodes thereof. The phase relationship between the waveforms applied to the respective controlled switches determines which of the devices are conductive at a given period of time. The pulse width of the particular pulse width modulated signal determines the time period during which the controlled switch passes current therethrough.

To supply the pulse width modulated signals to the control rectifiers S1a and S2a of the leg a, a pulse width modulator A is provided. The output of the pulse width modulator A is substantially as shown in FIG. 1 and reference is also made to curve A of FIG. 3, which shows the output waveform of pulse width modulator A being defined as having a carrier phase of 0°. The output of pulse width modulator A is supplied to a primary winding Wa of a transformer TFa. The top end of the primary winding Wa is dotted as shown. The transformer TFa has two secondary windings W1a and W2a. The top end of the winding W1a is dotted and coupled through a resistor R1a to the gate electrode of the controlled switch S1a. The undotted end of the winding W1a is connected to the cathode electrode of the switching device S1a. The bottom end of the other secondary winding W2a is dotted is connected to the cathode electrode of the controlled switch S2a, and the undotted end of the winding W2 is coupled through a resistor R2a to the gate electrode of the switching device S2a. As can be seen from the dot convention with respect to the windings Wa, W1a and W2a, the outputs as applied to the gate electrodes of the controlled switches S1a and S2a, respectively, are 180° out-of-phase, and, thus, when one of the devices S1a or S2a is conductive the other device is in its non-conductive state. Hence, if at a given instant of time the pulse width modulated signal at the primary winding Wa has a positive polarity at the dotted end thereof, a positive polarity signal will be applied to the gate electrode, with respect to the cathode, of the controlled switch S1a to render it conductive and permit the translation of current from anode to cathode therethrough. Conversely, since the undotted end of the winding W2a is coupled to the gate electrode of the device S2a, this device will be maintained in a non-conductive state blocking the passage of current therethrough. Upon the phase reversal of the pulse width modulated signal, with the dotted end of the winding Wa becoming negative, the controlled switch S2a will be gated on, while the controlled device S1a will be turned off by the application of a negative polarity signal to the gate electrode thereof.

A pulse width modulator B is provided for controlling the gate controlled switches S1b and S2b of the leg b of the bridge circuit. The output of the pulse width modulator B is shown in curve B of FIG. 3 and has a phase relationship with respect to curve A of FIG. 3, the output of the pulse width modulator A, of 180° phase difference therewith.

The output of the pulse width modulator B is applied to a primary winding Wb of a transformer TFb. Transformer TFb has two secondary windings W1b and W2b. The dotted end of the winding W1b is connected to the cathode electrode of the gate controlled switch S1b, while the undotted end thereof is connected through a resistor R1b to the gate electrode of the controlled switch S1b. The dotted end of the winding W2b is coupled through a resistor R2b to the gate electrode of the controlled switch S2b, while the undotted end is connected to the cathode electrode thereof. The dot convention for the windings Wb, W1b and W2b is such that the pulse width modulated signals as applied from the winding Wb through the windings W1b and W2b will be 180° out-of-phase with each other. Thus, whenever the gate controlled switch S1b is gated on by a positive polarity pulse, switch S2b will be turned off by a negative polarity pulse applied to the gate electrode thereof.

For the effective operation of the inverter apparatus, there is no need that diagonally opposite switching devices in the legs a and b be gated on simultaneously, that is, devices S1a and S2b or devices S2a and S1b need not always be conductive during the same time period, in contrast to prior inverter bridge circuits. Since the filter networks L1a–C1a and L1b–C1b, to some degree, instantaneously filter out the carrier frequency $f_c$ there is no real necessity that diagonally opposite controlled switches be gated on and off in phase for a circuit to be completed through the load Z with the unrejected output of frequency $f_o$ supplied to the load. By displacing the gating of diagonally opposed switches of the respective legs $a$ and $b$ in accordance with 180° phase displaced carrier signals, the effective carrier frequency as seen at the junctions J1 and J2, may be doubled as will be shown below.

Figure 3:
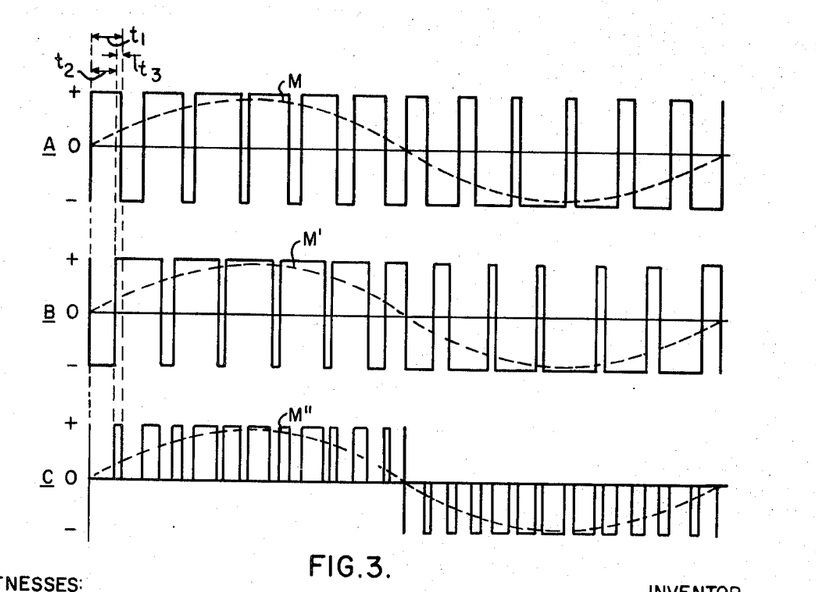
FIG. 3 is a waveform diagram including curves A, B and C which are utilized in explaining the operation of the apparatus of FIG. 2.

The outputs of the pulse modulators A and B, shown in curves A and B of FIG. 3, have carrier frequency components 180° out-of-phase. The dot conventions being as established in the windings of the transformers TF$a$ and TF$b$, one of the gate controlled switches in each of the legs $a$ and $b$ is conductive while the other switch thereof is non-conductive. Thus, as an example of this assume that at a given instant of time the output of the pulse width modulator A is positive at the dotted end of winding W$a$, e.g. during interval $t_1$ of waveform A of FIG. 3. This will gate on the controlled switch S1$a$ with the controlled switch S2$b$ being gated off. During the same interval $t_1$, the output of the pulse width modulator B changes from a negative value (during subinterval $t_2$) to a positive value (during subinterval $t_3$). With the indicated winding configuration, the gate controlled switch S1$b$ will have a positive polarity pulse applied at its gate electrode to gate that device on, while the controlled switch S2$b$ will have a negative polarity pulse applied thereto to turn it off, during subinterval $t_2$. Thus, the switches S1$a$ and S1$b$ will both be conductive, while the switches S2$a$ and S2$b$ will both be non-conductive during subinterval $t_2$. However, during subinterval $t_3$, S1$a$ and S2$b$ will be on and S2$a$ and S1$b$ will be off. Immediately following interval $t_1$, the polarity of waveform A reverses while that of waveform B does not. Thus S1$a$ will be turned off while S2$a$ is turned on with the states of S1$b$ and S2$b$ remaining the same (off and on, respectively). The conductive period of the controlled switches S1$a$, S1$b$, S2$a$ and S2$b$ is, therefore, determined by the pulse width and polarity of the pulses applied thereto.

The waveform appearing at the junction J$a$ will be substantially that shown in curve A of FIG. 3, however, at an increased power gain with respect to the gating pulses. V+ appears at J$a$ when S1$a$ is on and S2$a$ is off, i.e., when waveform A is positive; and V− appears at J$a$ when waveform A is negative. The waveform appearing at the junction J$b$, in the leg $b$ will be the inverse of that substantially as shown in curve B of FIG. 3, or (−B), again at an increased power gain as compared to the gate inputs thereto, because of the inversion produced by transformer TF$b$. V+ appears at J$b$ when waveform B is negative and V− appears at J$b$ when waveform B is positive.

It should be noted in curve A that the DC level is shown by the dotted curve M which defines a sinusoidal waveform at the desired output frequency $f_o$, which for example may be 400 Hz. Curve B shows the DC level of the pulse width modulated signal as a dotted waveform M' which also takes a sinusoidal waveform at the desired output frequency $f_o$. A comparison of the dotted waveforms M and M' shows that these sinusoidal waveforms are in phase with each other even though the carrier frequency waveforms are 180° out-of-phase with each other.

The signal waveform as seen between junction points J$a$ and J$b$ of the respective legs $a$ and $b$ of the bridge circuit is the difference between waveforms appearing at J$a$ and J$b$ $(A-(-B)) = A + B$. This difference waveform is shown in curve C of FIG. 3. Because the waveforms A and B are 180° out-of-phase with each other, the fundamental carrier frequency $f_c$ is cancelled from the resultant waveform as shown in curve C. The curve C shows the effective carrier frequency of the signal to be twice that of the actual carrier frequency $f_c$ of curves A and B. Thus, the effective carrier frequency of the waveform appearing between the junctions J$a$ and J$b$ is $2f_c$. It should be noted however that the DC level of the waveform of curve C, as shown by the dotted waveform M'', is still at the original output frequency $f_o$ and is in phase with the modulation waveforms M and M', respectively, of curves A and B of FIG. 3. The end result is that the waveform C appears to have an effective carrier frequency double that of the actual carrier frequency. For example, if the original carrier frequency is 10 kHz the effective carrier frequency will be 20 kHz. Waveform C would also have double the amplitude of A or B but for convenience of illustration, C is shown with the same maximum amplitude.

The waveforms appearing at the junction points J$a$ and J$b$ are applied to the filter networks including the inductor L1$a$ and the capacitor C1$a$ and the filter network including the inductor L1$b$ and the capacitor C1$b$. The filter networks are selected to operate as a low pass filter to permit the passage of the desired output frequency $f_o$ therethrough to be applied to the load Z, while eliminating other higher frequency components therefrom. However, since the effective carrier frequency $2f_c$ is double that of the actual carrier frequency, it is necessarily only that the capacitors C1$a$ and C1$b$ be selected to by-pass therethrough frequencies slightly below the effective carrier frequency $2f_c$. This will also eliminate harmonics of the effective carrier frequency $2f_c$. The inductors L1$a$ and L1$b$ are selected to be large enough to prevent excessive instantaneous device currents to flow in the switching devices S1$a$, S2$a$, S1$b$ and S2$b$, but are selected also to be small enough to minimize inductive reactance at the desired output frequency $f_o$.

Due to the elimination of the effective carrier frequency and its harmonics by the filter networks L1$a$–C1$a$ and L1$b$–C1$b$, the waveform as applied to the load Z is the DC level M'', which varies in accordance with the desired output frequency $f_o$. It is to be noted that the capacitance values of the capacitors C1$a$ and C1$b$ are smaller than would be required to eliminate the fundamental carrier frequency $f_c$. Moreover, the filter networks as utilized in the circuit shown in FIG. 2 are much smaller in size and weight than would be required to filter out the harmonics of the output frequency $f_o$ which is typically done in inverter systems.

In summary of the foregoing description of the operation of the circuit of FIG. 2, as illustrated by the waveforms of FIG. 3, the following table is presented:

| Waveform | |
|---|---|
| A | Represents the output of pulse width modulator A and also the form of the voltage at point J$a$. |
| M | Represents the sine wave contained within the pulse width modulated waveform A and is the form of the filtered voltage appearing at point T$a$. |
| B | Represents the output of pulse width modulator B. At point J$b$ |

| | |
|---|---|
| | appears a voltage waveform (−B) that is the inverse of B. |
| M' | Represents the sine wave contained within the pulse width modulated waveform B. At point Tb appears a filtered voltage waveform (−M') that is the inverse of M'. |
| C | Represents the signal appearing across terminals Ja and Jb which is the same as A − (−B) or A + B. |
| M'' | Represents the sine wave contained within the pulse width modulated waveform C and is the form of the voltage appearing across terminals Ta and Tb and supplied to the load Z. |

In FIG. 2, diodes D1a, D2a, D1b and D2b are connected in reverse polarity across the gate controlled switches S1a, S2a, S1b and S2b, respectively. That is, the cathode of a diode is connected to the anode of a controlled switch and the anode of the diode is connected to the cathode of the controlled switch so that current may pass through the diodes in the reverse direction from the conductive direction of the gate control switches. The diodes are required to permit reactive loads to be supplied by the inverter and provide a path current around the controlled switches to the DC source E. Due to the use of the inductors L1a and L2b and any reactance in the load Z, it becomes necessary that such a path be provided around the controlled switches for proper operation of the inverter.

The techniques described with reference to the two leg bridge shown in FIG. 2 can be extended to a larger number of legs with an appropriate phase control of the switching devices within these legs. The advantage obtained by increasing the number of legs in the bridge circuit in that higher power inverters can be provided while using low power switching devices. Additional advantages will be pointed out in the discussion of FIG. 4 which follows immediately.

Figure 4:
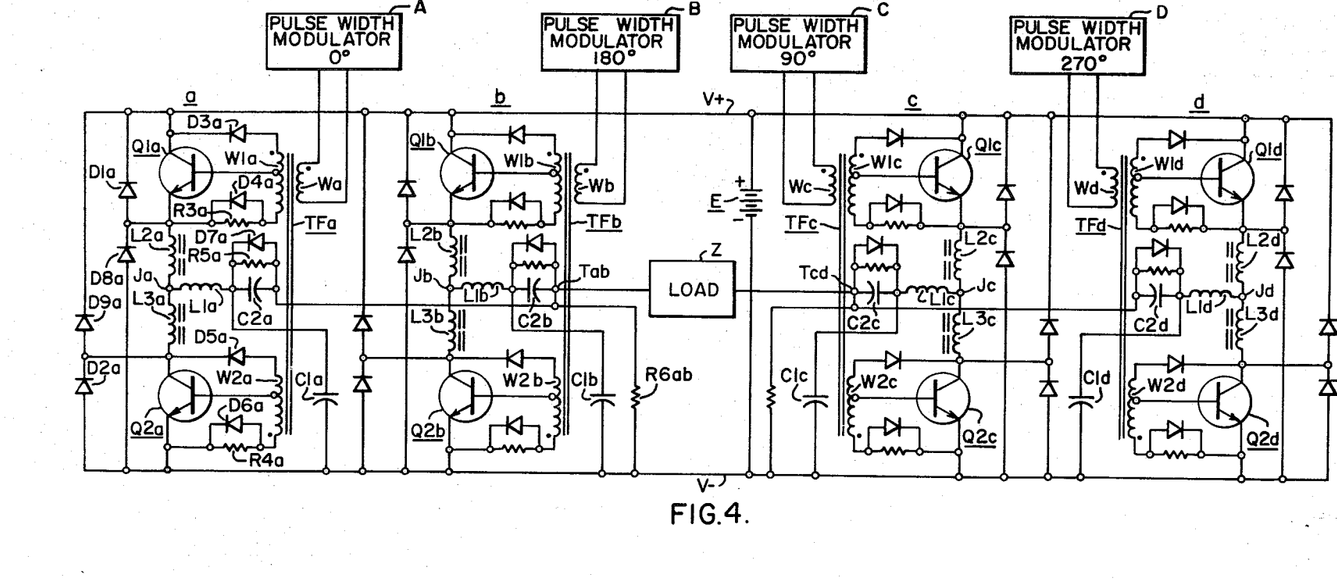
FIG. 4 is a schematic diagram of another embodiment of the inverter apparatus of the present invention.

FIG. 4 is a schematic diagram of a four leg inverter system including legs a, b, c, and d and wherein each of the legs are controlled by applying pulse width modulated signals thereto in a predetermined phase relationship to one another. Each of the legs a, b, c and d of the bridge circuit shown in FIG. 4 are substantially identical and are connected across a source of direct current indicated as a battery E which has its positive electrodes connected at the V+ line and its negative electrode connected at the V− line. Each of the legs include a pair of transistors: transistors Q1a and Q2a are connected in leg a; transistors Q1b and Q2b in leg b; transistors Q1c and Q2c in leg c; and transistors Q1d and Q2d in leg d. The transistors are shown to be of the NPN type, however, a PNP type could be utilized with the appropriate change in polarity in the driving potential therefor. The transistors are operative in a switching mode to translate current from the direct current source E to a load Z.

A pulse width modulator is provided to control the conductive states of the transistors in each of the legs of the bridge circuit. Pulse width modulators A, B, C and D, respectively, supply outputs to the legs a, b, c and d. The output of each of the pulse width modulators a, b, c and d has a waveform such as shown in FIG. 1, however, the phase relationship of each of these outputs is defined in FIG. 5 in curves A, B, C and D, respectively. It can be seen from these curves that taking the output of the pulse width modulator A as 0°, the output of the pulse width modulator B is delayed 180° therefrom; the pulse width modulator C is delayed 90° therefrom; and the pulse width modulator D is delayed 270° therefrom. The pulse width modulated signal supplied by the modulators A, B, C and D are at a predetermined carrier frequency $f_c$, which for example may be 10 kHz.

Since the circuitry associated with each of the legs of the inverter is substantially identical only the specific circuitry of leg a will be discussed for illustrative purposes. Also, similar reference characters with respect to FIG. 2 are used for the corresponding components in FIG. 4. The pulse width modulator A supplies a pulse width modulated output to the primary winding Wa of the transformer TFa, with the waveform being substantially as shown in curve A of FIG. 3 having a carrier frequency of $f_c$ and a DC level such as shown in the waveform M varying at the desired output frequency $f_o$. The transformer TFa includes two secondary windings W1a and W2a. The dotted end of the winding W1a is connected to the anode of a diode D3a with the cathode of the diode connected to the collector of the transistor Q1a. The collector of the transistor Q1a is connected to the V+ line, while the emitter electrode thereof is coupled through a resistor R3a to the bottom end of the winding W1a. The base electrode of the transistor Q1a is connected to a tap on the winding W1a. A diode D4a is connected directly across the resistor R3a with its cathode connected to the emitter electrode of the transistor Q1a. The tapped connection of the transistor Q1a to the secondary winding W1a permits the non-saturated operation of the transistor Q1a. Assume that the transistor Q1a is initially blocking. There is a current flow into the base electrode of the transistor Q1a which is limited by the voltage developed across the transformer winding W1a between the tap and the bottom end thereof divided by the resistance of the resistor R3a. If the load current of the transistor Q1a is at a small enough level so that the transistor Q1a will go into saturation, current will tend to flow through the diode D3a to the collector electrode of the transistor Q1a. This diverts current from the base of the transistor to the collector thereof thus reducing the base drive until the collector voltage increases several volts and permits base drive for the transistor again. Stable non-saturated operation is thus obtained with base drive just sufficient to maintain a slight voltage drop from collector to emitter of the transistor Q1a. The operation of the transistor Q1a in a non-saturating mode permits maximum switching speed to be obtained. Increased switching speed is also obtained by placing the diode D4a across the resistor R3a to permit maximum turn off drive to be applied to the transistor Q1a at the end of a conduction in interval.

The other transistor Q2a in the leg a has its base electrode connected to a tap on the secondary winding W2a. The emitter electrode thereof is connected to the V− line and the collector is connected to the cathode of a diode D5a, which has its anode connected at the undotted end of the winding W2a. The dotted end of the winding W2a is connected through the resistor R4a to the emitter electrode of the transistor Q2a. A diode D6a is connected across the resistor R4a with the cathode electrode thereof connected to the emitter of the transistor Q2a. The operation of the transistor Q2a is identical to that of the transistor Q1a, however with the dot convention as established with reference to the primary winding Wa of the transformer TFa being such that whenever the transistor Q1a is in its conductive state the transistor Q2a is in its blocking state and vice versa.

When transistors are connected as shown in FIG. 4, one transistor may turn on before the other has fully regained full blocking capability. In order to prevent a short circuit, even for this very short interval of time, an inductor L2a is connected between the emitter of the transistor Q1a and the junction Ja, and an inductor L3a is connected between the collector of the transistor Q2a and the junction Ja.

The voltage appearing at the junction Ja is essentially the pulse width modulated waveform which is to be synthesized to form the output alternating current applied to the load Z. The output appearing at the junction Ja is, of course, greatly increased in power in comparison to the pulse width modulated signals used to gate the transistors of the inverter circuit. A filter network including the inductor L1a and capacitor C1a is connected to the junction Ja. The inductor L1a is selected to prevent excessive instantaneous transistor current to flow through the transistor Q1a and Q2a. The inductor L12 is also selected to be small enough to minimize reactance at the output frequency $f_o$.

The capacitor C1a is connected between the inductor L1a and the V− line and is selected to provide a bypass to high frequency signals. The inductor L1a and capacitor C1a act as the filter network as discussed with reference to FIG. 2. The output of the filter network L1a–C1a is connected through a capacitor C2a to an output terminal Tab of the inverter which is connected to the load Z. The capacitor C2a is of the electrolytic type to provide DC blocking which is necessary in the inverter circuit since no provision is made therein to regulate critically the DC voltage level at the outputs of the four legs a, b, c and d. The value for the capacitor C2a is selected to be somewhat smaller than to have negligible capacitive reactance at the desired output frequency $f_o$, and thereby tends to cancel out the inductive reactance of the filter inductor L1a. By so selecting the capacitor C2a, a low impedance output stage is achieved. A diode D7a is connected across the capacitor C2a with its cathode toward the inductor L1a. A resistor R5a is also connected across the capacitor C2a, while a resistor R6ab is connected from the capacitor C2a and terminal Tab to the V− line. The function of the diode D7a and the resistors R5a and R6ab is to insure that the electrolytic capacitor C2a is properly biased.

In order that the system is capable of carrying reactive power, diodes D1a, D2a, D8a and D9a are utilized. The diode D1a is connected from anode to cathode between the emitter and collector electrodes, respectively, of the transistor Q1a. The diode D8a is connected from anode to cathode between the V− line and the emitter of the transistor Q1a. The diode D2a is connected from anode to cathode between the emitter and collector electrodes of the transistor Q2a, and the diode D9a is connected from anode to cathode between the collector electrodes, respectively, of the transistors Q2a and Q1a. These diodes permit a reverse current path to the battery E around the reverse directions of the transistors Q1a and Q2a. Because the change of voltage with time across the diodes D8a and D9a is quite large, it is preferable that these diodes be of a fast recovery type.

The circuitry of the other three legs b, c and d of the inverter shown in FIG. 4 is similarly arranged and function identically to that of leg a. At the output junction Jb of the leg b, pulse width modulated signals are developed which are similar in waveform to that shown in FIG. 1 and which are 180° out-of-phase with the waveform appearing at the junction Ja of the leg a. The output of the leg b from the junction Jb is supplied through the filter network including the inductor L1b and capacitor C1b through the coupling capacitor C2b to the output terminal Tab. At the output junction Jc of the leg c, a waveform similar to that shown in FIG. 1 is developed having a phase relationship of 90° from that of the leg a appearing at the junction Ja. This output is supplied through the filter network including L1c and the capacitor C1c, and is then applied through the coupling capacitor C2c to the other output terminal of the inverter Tcd. The output of the leg d appears at the junction and has a waveform such as shown in FIG. 1, however, displaced 270° from the output of the junction Ja of the leg a. This output is applied through the filter network including the inductor L1d and the capacitor C1d and then through the coupling capacitor C2d to the output terminal Tcd. The combined outputs of the four legs a, b, c and d are thus applied across the load Z with the outputs at junctions Ja and Jb being added and the outputs from the junctions Jc and Jd being substracted therefrom.

Figure 5:
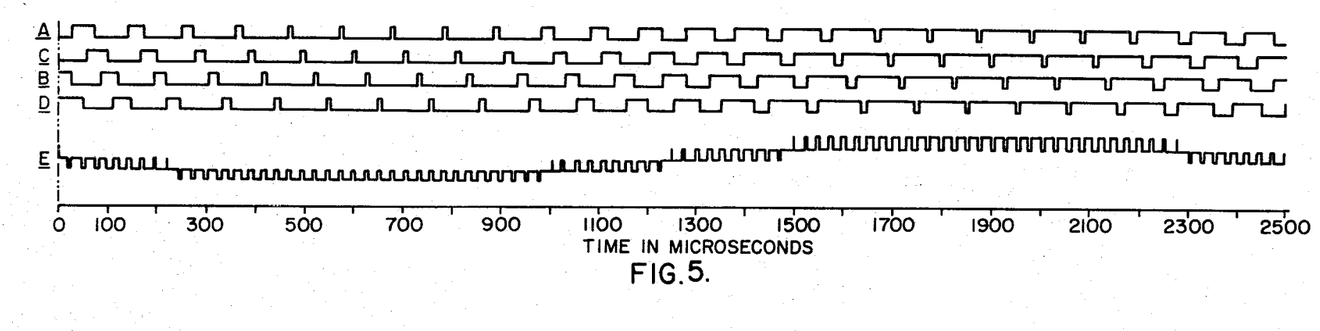
FIG. 5 is a waveform diagram including curves A, B, C, D and E which are utilized to explain the apparatus shown in FIG. 4.

FIG. 5 in curves A, B, C and D shows a waveform diagram of the outputs appearing respectively at the junctions Ja, Jb, Jc and Jd of the legs a, b, c and d. The frequency of the waveforms in curves A, B, C and D is that of the carrier frequency $f_c$. However, by taking the algebraic sum of the waveforms of curves A, B, C and D a composite waveform such as shown in curve E of FIG. 5 is obtained. It can be seen that the waveform E is at four times the carrier frequency $f_c$, with the first, second and third harmonics of the carrier frequency being cancelled in the summation of these waveforms.

Figure 6:
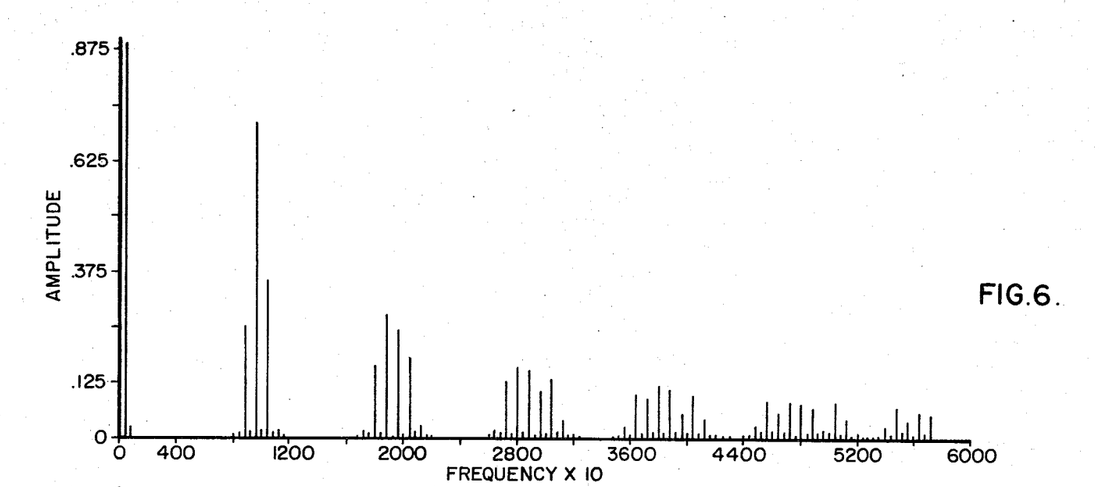
FIG. 6 is a frequency spectrum plot of the waveform shown in curves A, B, C or D of FIG. 5.
Figure 7:
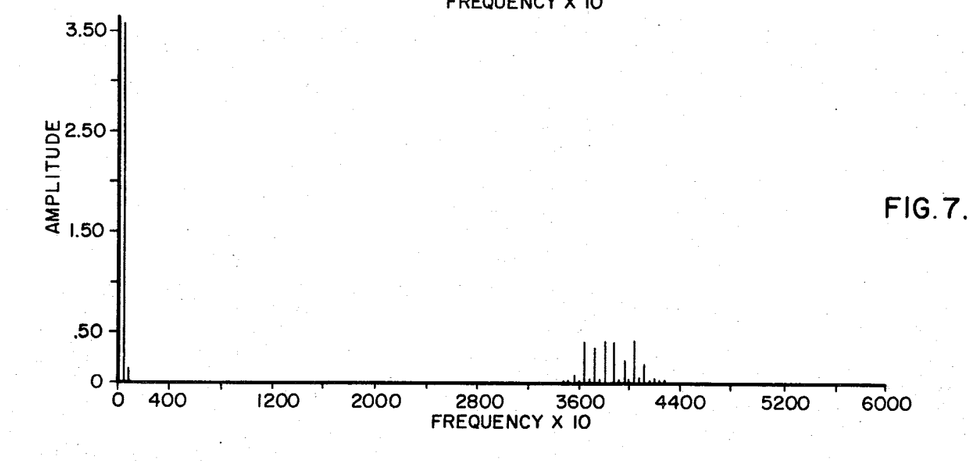
FIG. 7 is a frequency spectrum plot the combined output waveform of the inverter of FIG. 4.

This is better seen by reference to FIGS. 6 and 7. FIG. 6 shows a frequency spectrum plot of a waveform such as shown in curves A, B, C or D of FIG. 5. The fundamental carrier frequency $f_c$ is shown to be 9.6 kHz., the first, second, third and fourth harmonics being, respectively; 19.2 kHz., 28.8 kHz. and 38.4 kHz. The presence of relatively high amplitude components appearing at these frequencies is shown on the plot of FIG. 6. Relatively high amplitude components are also shown to appear at fifth and sixth harmonic frequency of the 9.6 kHz. fundamental. The 400 Hz power output frequency $f_o$ is also shown.

FIG. 7 is a frequency spectrum plot of the combined output voltage appearing at the junctions Ja, Jb, Jc and Jd of the inverter of FIG. 4 using the staggered phase cancelling technique as described herein. As can be seen from the plot, the power output frequency of 400 Hz appears; however, the first, second and third harmonics have been cancelled. The fourth harmonic is the first to appear in plot. The fifth and sixth harmonics also do not appear in the plot.

The fourth harmonic of the fundamental frequency thus appears as the effective carrier frequency of the inverter. The filter network must then only eliminates frequencies above approximately four times, the fundamental, or in the present example, have a low frequency cutoff of slightly lower than 38.4 kHz., with a fundamental frequency of 9.6 kHz. It should also be noted that the frequency about 38.4 kHz. in FIG. 7 is of a relatively low amplitude as compared to the fundamental and other components of the spectrum as shown in FIG. 6. Hence, the filter with a spectrum as shown in FIG. 7 is only required to attenuate a relatively low amplitude signal. Thus, the effective carrier frequency of the waveform shown in curve E of FIG. 5 is four times the actual carrier frequency of $4f_c$. It is only necessary to eliminate the effective carrier frequency $4f_c$ from the waveform E in order to synthesize the desired output frequency $f_o$. The capacitors $C1a$, $C1b$, $C1c$ and $C1d$ thus can be relatively small and need only shunt frequencies above and including four times the actual carrier frequency $f_c$.

Therefore, through the use of the four leg inverter circuit and the appropriate application of pulse width modulated signals to control the gating of the transistors used in each of the legs, an inverter circuit having an effective carrier frequency of four times the actual carrier frequency can be provided with the attendant advantage of reducing the size of the filter network needed to synthesize the sinusoidal output signal at the desired output frequency $f_o$. Of course, more legs could be added to the bridge, with the increased power capacity and reduced filter size being obtained with the appropriate phase relationship being maintained between the various legs of the inverter. The effective carrier frequency will be equal to the number of legs times the actual carrier frequency.

Although the present invention has been described with a certain degree of particularity, it should be understood that the present disclosure has been made only by way of example and that numerous changes in the combination and arrangement of parts and elements can be resorted to without departing from the scope and spirit of the present invention.

I claim:

1. In inverter apparatus operative with a source of direct current for supplying a load circuit with alternating current having a predetermined output frequency, the combination of:
   a bridge circuit including a plurality of legs connected operatively across said source of direct current,
   each of said legs including a pair of switching devices operatively connected and operative to be placed in a selected open or closed circuit switched state;
   means for providing pulse width modulated signals having a predetermined carrier frequency and being so modulated to have an average value varying at said predetermined output frequency;
   means for applying said pulse width modulated signals to said switching devices of said plurality of legs, respectively, in a predetermined phase relationship so that said devices in each of said legs are placed in an open or closed circuit switch state in response thereto; and
   filter means operatively connecting said legs of said bridge circuit and said load circuit,
   said filter means being so selected to reject frequencies above and including a given multiple of said predetermined carrier frequency, said predetermined phase relationship being such that said predetermined carrier frequency does not appear across said load circuit and the effective carrier frequency appears to be said multiple of said predetermined frequency that is rejected by said filter means with said alternating current having a predetermined output frequency being applied to said load circuit.

2. In the inverter apparatus of claim 1 wherein:
   whenever one of said pair of said switching devices is placed in a closed circuit switched state the other of said pair is placed in an open circuit switched state,
   predetermined ones of said pair of said switching devices in each of said legs being placed in the same switched state during the same period of time.

3. In the inverter apparatus of claim 2 wherein:
   said bridge circuit including a first and a second leg connected on the opposite sides of said bridge circuit,
   each of said legs including a first and a second switching device connected in series with a junction formed therebetween,
   said filter means operatively connected between said junctions in each of said legs and said load,
   said predetermined phase relationship for said pulse width modulated signals applied to said switching devices in said first and second legs being substantially 180° out of phase with each other,
   said first and said second devices of said first and second legs respectively being placed in the same switched state during the same period of time,
   said given multiple of said predetermined carrier frequency being two.

4. In the inverter apparatus of claim 2, wherein:
   said bridge circuit including first, second, third and fourth legs, said first and said second legs being connected on one side of bridge circuit and said third and fourth legs being connected on the other side thereof,
   said predetermined phase relationship for said pulse width modulate signals being applied to said switching devices of said first, second, third and fourth legs, respectively being substantially 0°, 180°, 90° and 270°,
   said given multiple of said predetermined carrier frequency being four.

5. In the inverter apparatus of claim 2 wherein:
   said switching devices comprise gate controlled switches.

6. In the inverter apparatus of claim 2 wherein:
   said switching devices comprise transistors operative in a switching mode.

7. In the inverter apparatus of claim 6, further including:
   means for preventing said transistors from going into saturation so as to decrease the switching time thereof.

8. In the inverter apparatus of claim 2, further including:
   a unidirectional device connected across each of said switching devices to provide a reverse current path thereacross so that said inverter may be operative with reactive loads.

9. In the inverter apparatus of claim 2 wherein:
said filter means including an inductor to limit the current through said switching devices within their ratings and a capacitor to shunt away from said load circuit frequencies above and including said multiple of said predetermined carrier frequency.

* * * * *